United States Patent [19]

Wellman et al.

[11] Patent Number: 5,334,652
[45] Date of Patent: Aug. 2, 1994

[54] POLYESTER-BASED COATING COMPOSITIONS HAVING HIGH PIGMENT-TO-BINDER RATIOS

[75] Inventors: William E. Wellman, Edison, N.J.; Albert I. Yezrielev, Seabrook; Ralph M. Kowalik, Kingwood, both of Tex.

[73] Assignee: Exxon Chemical Patents, Inc., Linden, N.J.

[21] Appl. No.: 717,784

[22] Filed: Jun. 18, 1991

[51] Int. Cl.$^5$ .................. C08L 67/00; C08G 63/78
[52] U.S. Cl. .................. 524/601; 524/597; 428/482; 528/274
[58] Field of Search ............ 524/597, 601; 428/482; 528/274

[56] References Cited

U.S. PATENT DOCUMENTS

| | | | |
|---|---|---|---|
| 3,714,090 | 1/1973 | Lasher | 528/295.5 |
| 3,714,091 | 1/1973 | Lasher | 528/295.5 |
| 4,140,729 | 2/1979 | Tobias et al. | 528/302 |
| 4,229,555 | 10/1980 | Tobias et al. | 525/443 |
| 4,303,563 | 12/1981 | Emmons et al. | 525/257 |
| 4,343,925 | 8/1982 | Chang et al. | 528/107 |
| 4,358,477 | 11/1982 | Noomen et al. | 528/75 |
| 4,393,121 | 7/1983 | Tobias et al. | 428/458 |
| 4,520,188 | 5/1985 | Holzrichter et al. | 528/274 |
| 4,734,467 | 3/1988 | Yamada et al. | 525/440 |
| 4,981,944 | 1/1991 | Bartels et al. | 528/220 |

FOREIGN PATENT DOCUMENTS

| | | |
|---|---|---|
| 549641 | 2/1986 | Australia . |
| 034919 | 9/1981 | European Pat. Off. . |
| 0330719 | 9/1989 | European Pat. Off. . |
| 0397484 | 11/1990 | European Pat. Off. . |
| 0419088 | 3/1991 | European Pat. Off. . |

*Primary Examiner*—John Kight, III
*Assistant Examiner*—T. Mosely

[57] ABSTRACT

The present invention is directed towards liquid coating formulations containing a mixture of a curable polyester or diester resin, an amino crosslinking agent and a pigment wherein the pigment is dispersed in the coating solution at a weight loading level such that the pigment to binder ratio falls within the range of from 1.25 to 1 up to about 5.0 to 1. The polyester or diester resins employed in the coating formulations are such that when formulated with an appropriate crosslinking agent, acid catalyst and pigment within the ranges stated above and properly applied to a substrate and cured, produce coatings having a minimum Knoop hardness of at least about 4 and a flexibility (T-bend test) of less than 6, generally less than about 5, and a MEK rub value of greater than 5, more preferably at least about 15 and most preferably greater than 50.

Cured coating compositions prepared in accordance with this invention exhibit all of the attributes considered essential for coil coatings, i.e., good adhesion to the substrate and good gloss, and in addition provide an excellent balance of flexibility and hardness qualities despite high pigment loadings, and good to excellent weatherability when exposed to outdoor conditions.

23 Claims, No Drawings

POLYESTER-BASED COATING COMPOSITIONS HAVING HIGH PIGMENT-TO-BINDER RATIOS

BACKGROUND OF THE INVENTION

Field of the Invention

The present invention relates to curable, flexible coating and paint compositions based on polyester resinous binder and containing pigment at a high pigment to binder ratio.

Description of Related Art

Coating formulations usually contain a number of components. A primary component is resin, which can be natural or synthetic. The resin acts as a polymeric coating binder, or as a polymeric coating vehicle for the coating formulation. In addition, most coatings require a solvent, and the coating may also contain a wide variety of additives. Further, many coatings also contain a crosslinking agent, which after application of the coating vehicle to a substrate, reacts chemically with the resin during a curing stage to produce a film containing a crosslinked network. The crosslinked network is often necessary for the production of good film properties. The curing stage can be conducted at ambient conditions ("air-dry system") or at elevated temperatures ("baked system"). In either case, the solvent is evaporated during the curing stage, resulting in a coating film. A number of properties are important for the coating film, including hardness, flexibility, weather resistance (weatherability), chemical resistance, solvent resistance, corrosion resistance, adhesion to various substrates, and impact resistance. The properties depend on many factors including type, molecular weight, monomer composition, and glass transition temperature (Tg) of the resin; type and amount of the crosslinker; curing conditions; curing catalyst; and additives. Variations of these parameters can be used to create a wide range of differences in film properties to fit requirements for a number of diverse applications. However, it is not always possible to optimize all of the desirable properties simultaneously.

Coil coating is a well known process for coating metallic substrates. In this process, metal in rolled sheet form is unrolled and fed to a coating zone wherein a suitable curable coating composition is applied by any suitable technique such as spray coating or dip coating. The coated sheet is then fed into a dryer zone wherein sufficient heat is applied to dry the coating and cure the coating formulation. The coated sheet is then rewound and transferred for further handling and fabrication into such articles as bottle caps, containers, labels, emblems, building panels, siding for buildings and the like.

Several criteria must be met by curable coatings which are suited for coil coating applications. They must be rapid curing since coil coating lines often operate at a sheet speed of 200 ft./minute or higher. The cured coating must be of sufficient hardness to resist abuse associated with the forming or stamping of shaped articles therefrom, as well as the weight of the coil pressing on its inner layers when rolled up. The coatings must at the same time be flexible enough to be rolled up, unrolled and withstand the forming and stampimg operations without cracking or chipping. In many cases, the coatings must also exhibit good weather resistance, especially for outdoor applications. And the coatings should be formulated with sufficient pigment content to provide optimum hiding power over the underlying metal surface, thereby yielding coated surfaces which are more appealing to the eye and less expensive to formulate.

There are a number of coating formulations disclosed in the art based on curable polyester binder material which are disclosed to be suitable for use in coil coating applications. Representative examples of such formulations are disclosed in U.S. Pat. Nos. 3,714,090, 4,140,729, 4,229,555, 4,393,121, 4,520,188 and 4,734,467. These formulations generally comprise a high solid content solution of curable polyester resin in organic solvent, which solution also contains a crosslinking agent such as an amino or aminoplast crosslinker, an optional crosslinking catalyst and a pigment and/or extender dispersed in the solution. Where present, the pigment content to resin content generally is at a weight ratio of less than 1.25:1 respectively. These formulations may also contain other conventional ingredients used in such formulations.

The weight ratio of pigment to binder (P/B) is generally less than 1.25:1, usually within the range of 0.8:1 to 1.1:1. This P/B ratio is determined to be the best in terms of optimum properties of the final film and attempts to raise the P/B to 1.5 or 2.0 or higher result in the deterioration of some or many of the important coating properties. The properties which are adversely effected may include flexibility, solvent resistance or weatherability. Thus, the advantages that certain polyester-based coating formulations may offer are lost at higher pigment loadings, thereby rendering such materials less suitable or unsuitable for such applications.

SUMMARY OF THE INVENTION

The present invention is directed towards liquid coating formulations containing a mixture of a curable polyester or diester resin, an amino crosslinking agent and a pigment wherein the pigment is dispersed in the coating solution at a weight loading level such that the pigment to binder ratio falls within the range of from 1.25 to 1 up to about 5.0 to 1. The polyester or diester resins employed in the coating formulations are such that when formulated with an appropriate crosslinking agent, acid catalyst and pigment within the ranges stated above and properly applied to a substrate and cured, produce coatings having a minimum Knoop hardness of at least about 4, a flexibility (T-bend test) of less than 6, generally less than about 5, and a methyl ethyl ketone (MEK) rub value of greater than about 5, more preferably at least about 15 and most preferably greater than 50.

Cured coating compositions prepared in accordance with this invention exhibit all of the attributes considered essential for coil coatings, i.e., good adhesion to the substrate and good gloss, arid in addition provide an excellent balance of flexibility and hardness qualities despite high pigment loadings, and good to excellent weatherability when exposed to outdoor conditions.

DETAILED DESCRIPTION OF THE INVENTION

Polyester resins which may be employed in the coating formulations of this invention comprise polyester or diester diols which optionally may be end-capped with a carboxylic acid substituted phenol, and polyester or diester diacids which are end capped with a dihydric phenol. Preferred polyester resins generally exhibit a number average molecular weight within the range of from about 1,500 to about 10,000, more preferably from about 2000 to about 7500.

Polyester diols may be formed by the condensation reaction of a di or polyol with a di- or polyacid. The polyol generally contains more than 2, preferably 2 to about 10 carbon atoms, more preferably about 2 to 8 carbon atoms, in addition to having 2 to about 6, preferably 2 to about 4, hydroxyl groups. Some preferred examples of the polyols are one or more of the following: neopentyl glycol; ethylene glycol; propylene glycol; butanediol; hexamethylemediol; 1,2-cyclohexanedimethanol; 1,3-cyclohexanedimethanol; 1,4-cyclohexanedimethanol; trimethylol propane; pentaerythritol; neopentyl glycol hydroxypivalate diethylene glycol; triethylene glycol; tetraethylene glycol; dipropylene glycol; polypropylene glycol; hexylene glycol; 2-methyl-2-ethyl-1,3-propanediol; 2-ethyl-1,3- hexanediol; 1,5-pentanediol; thiodiglycol; 1,3-propanediol; 1,3-butanediol; 2,3-butanediol; 1,4-butanediol; 2,2,4-trimethyl 1,3-pentanediol; 1,2-cyclohexanediol; 1,3- cyclohexanediol; 1,4-cyclohexanediol; glycerol; trimethylolpropane; trimethylolethane; 1,2,4-butanetriol; 1,2,6-hexanetriol; dipentaerythritol; tripentaerythritol; mannitol; sorbitol; methylglycoside; like compounds apparent to those skilled in the art; and mixtures thereof.

The polyacids contain about 2 to 34 carbon atoms in aliphatic or aromatic moieties, and at least 2, preferably no more than 4, carboxyl groups which may, alternatively, be present in the form of anhydride groups. The polyacids are preferably one or more of the following: phthalic anhydride, terephthalic acid, isophthalic acid, adipic acid, succinic acid, glutaric acid, fumaric acid, maleic acid, cyclohexane dicarboxylic acid, trimellitic anhydride, azeleic acid, sebasic acid, dimer acid, pyromellitic dianhydride, substituted maleic and fumaric acids such as citraconic, chloromaleic, mesaconic, and substituted succinic acids such as aconitic and iraconic. Mixtures of polyols or polyacids or both can be employed.

Termination of the polyester molecules by hydroxy-containing monomers is provided by using a molar excess of the diol in the polyester-forming reaction.

Polyesters exhibiting good flexibility properties when cured are preferably prepared using aliphatic reactants on the polyol side and aliphatic or mixed aliphatic-/aromatic reactants on the acid side. Preferred of such polyesters are the hydroxy terminated condensation products of adipic acid, neopentyl glycol and phthalic, isophtahlic, terephthalic acids and/or phthalic anhydride.

Another specific class of polyester resins which may be used in preparing the coating formulations of this invention are phenol terminated diesters as disclosed in copending U.S. application Ser. No. 630,298 filed Dec. 19, 1990, the disclosure of which is incorporated herein by reference. These materials are characterized by the structure 1:

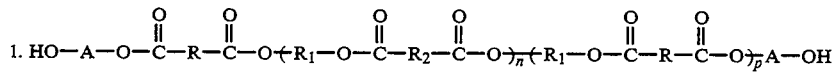

wherein R is an aliphatic divalent hydrocarbon radical containing 2 to 40 carbon atoms or a mixture of such radicals, provided however that R contains at least about 8 carbon atoms when n is O and p is O, $R_1$ is an aliphatic or cycloaliphatic hydrocarbon radical containing 2 to 40 carbon atoms or a mixture of such radicals, $R_2$ is an aliphatic, aromatic or a mixture of aliphatic and aromatic hydrocarbon radicals having from 2 to 40 carbon atoms, A is divalent aromatic radical selected from the group consisting of phenylene, naphthylene or bis phenylene in which two phenylene groups are connected to each other directly or through divalent atoms or radicals, p is 0 or 1, n is 0 or an integer ranging from 1 to about 40, provided however, that p is 0 when n is 0 and p is 1 when n is an integer.

These diesters may be generally categorized as the esterification product of a backbone material containing terminal carboxyl groups and a dihydric phenol such that each terminal group present on the backbone material reacts with a single hydroxy group present on the dihydric phenol resulting in an oligomer or polymer containing a free aromatic hydroxy group at terminal ends of the polymer chain. The backbone material may be composed of: (a) an aliphatic dicarboxylic acid or mixtures of such acids, having from about 8 to about 40 carbon atoms in which case n and p of formula 1 would each be o; and (b) a carboxy-terminated polyester or polyester/alkyd reaction product of one or more aliphatic dicarboxylic acids having from 2 to 40 carbon atoms, or mixtures of such acids with one or more aromatic dicarboxylic acids having from 8 to 40 carbon atoms, in which case in formula 1, n would be an integer ranging from 1 to about 40 and p would be 1.

Diesters of type (a) described above are characterized by the following general formula 2:

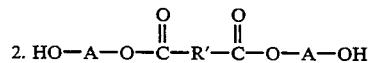

wherein R' is an aliphatic radical containing from about 8 to about 40 carbon atoms and A is as defined above.

Diesters of the type (b) described above are characterized by the following general formula 3:

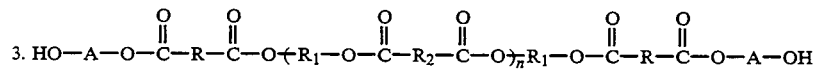

wherein R is an aliphatic or cycloaliphatic radical containing from 2 to about 40 carbon atoms, n is an integer ranging from 1 to about 40, and $R_1$, $R_2$ and A are as defined above.

The dihydric phenols which may be connected by an ester linkage to the terminal carboxyl groups present in the backbone material are aromatic compounds having two hydroxy substituent groups attached directly to the aromatic ring and may be represented by the structure:

wherein A is a divalent radical selected from the group consisting of phenylene, naphthalene or bis phenylene radicals having the structure:

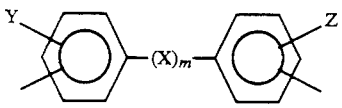

wherein m is 0 or 1, X is selected from the group consisting of a $C_1$ to $C_{12}$ hydrocarbon divalent radical cycloaliphatic divalent radical having 5-12 carbon atoms, S, O, and $R_4$—C—$R_4$ wherein $R_4$ may be the same or different and is selected from the group consisting of hydrogen, $C_1$ to $C_6$ alkyl, cycloalkyl, phenyl and $CF_3$, and Y and Z are independently selected from the group consisting of hydrogen, halogen, $C_1$ to $C_4$ alkyl and $C_1$ to $C_4$ alkoxy.

Examples of preferred dihydric phenols include hydroquinone, resorcinol, phenolphthalein, 1,4-dihydroxynaphthalene, 1,5-dihydroxynaphthalene, and 2,6-dihydroxynaphthalene. Examples of preferred diphenols include 2,2-bis(4-hydroxyphenyl) propane [bisphenol A], 1,1-bis(4-hydroxyphenyl) ethane, bis (4-hydroxyphenyl) methane, 1,2-bis (4-hydroxyphenyl) ethane, bis (4-hydroxyphenyl) sulfide, and 2,2-bis (4-hydroxyphenyl) hexafluoropropane.

Another category of polyester resin which may be utilized in the present invention are materials analogous to those described in formulas 1, 2 and 3 above except that the terminal groups present on the polyester backbone which are esterfied with an aromatic phenol are hydroxy rather than carboxyl groups. These esterphenol capped polyesters are prepared by esterfication of the terminal backbone hydroxy moieties with a hydroxy substituted aromatic acid such as hydroxy benzoic acid.

These materials may be generally categorized by the analogous formulas 4 and 5 as follows:

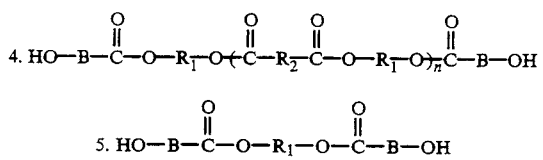

wherein n, $R_1$ and $R_2$ are as defined above and wherein B is phenylene or naphthylene or substituted aromatic moieties as described in copending U.S. patent application Ser. No. 543,616, filed Jun. 22, 1990. Formula 5 is formula 4 where n is O.

These materials and their method of preparation are more particularly described in copending U.S. application Ser. No. 543,616, filed Jun. 22, 1990, the disclosure of which is incorporated herein by reference.

As pointed out in the aforementioned pending applications, the esterification reactions are normally carried out at temperatures between about 140° and 260° C. and for a period of time ranging from about 3 to about 15 hours with or without the use of acidic esterification catalysts such as phosphorous acid or toluene sulfonic acid present at a level of about 0.01 up to about 2.0 wt. %. The reaction is optionally carried out in the presence of a solvent. When present, the solvent is preferably an aromatic hydrocarbon. The esterification may be carried out using a single or two stage process.

The preferred polyester resins generally have a glass transition temperature (Tg) of less than about 55° C. and are either liquid materials or are solids readily soluble at high solids levels in coating solvents such as aromatic hydrocarbon solvents or a mixture of an aromatic hydrocarbon with an oxygenated solvent.

Amino-crosslinking agents which are useful in preparing thermoset coating formulation are those materials which will classically react with the hydroxyl terminal groups of the polyester. Suitable materials include, butylated or methylated urea-formaldehyde resins, butylated melamine-formaldehyde resins, hexamethoxymethylmelamine or mixtures of various hydroxymethyl-melamime-methyl ethers such as the pentamethyoxymethylmelamime and the tetramethoxymethyl melamines, and high-amino/polymeric melamines. The hydroxymethylmelamine and hydroxymethyl ureas may also be etherified with alcohols other than methyl or butyl such as ethyl, propyl, isobutyl and isopropyl. Other suitable amino crosslinking resins are described in the aforementioned copending application.

The amount of crosslinking agent on a weight basis incorporated into the final coating composition may generally range from about 2 up to about 25% by weight, based on the combined weight of all components (pigments, etc.) present in the coating composition. The most preferred level of addition is from about 3 to about 20% by weight. This translates into a content of crosslinking agent of from greater than about 5 up to about 45% by weight, based on the weight of the binder alone. For the purposes of this disclosure, the term "binder" refers to the combined weight of the resin and crosslinking agent. The preferred level of crosslinking agent ranges from about 7 up to about 30% by weight, based on the weight of binder.

Expressed another way, the content of crosslinking agent should be such that the ratio of the active crosslinking groups, i.e., methylol (alkoxymethyl) groups, of the amino crosslinking agent to the hydroxy groups on the polymer backbone is desirably from about 1.0:1.0 to 15.0:1.0, preferably from about 1.5:1.0 to 5.0:1.0. The lower the molecular weight of the polyester polymer, the larger the number of terminal hydroxy groups present and the larger the quantity of crosslinking agent required to properly cure the resin. Conversely, the higher the molecular weight of the polyester polymer, the fewer the number of terminal hydroxy groups and the lesser the quantity of crosslinking agent required to properly cure the resin.

The same or different solvent(s) which are optionally used during the synthesis of the polyester to dissolve reactants may also be added during the formulation of the coating composition to adjust viscosity so as to provide a formulation with a viscosity usually between about 10 centipoise to 10 poise. One or more solvents can be used. In many cases, a single solvent is used to solubilize the system. However, in other cases it is often desirable to use mixtures of solvents in order to effect the best solubilization, and in particular a combination of aromatic solvents with oxygenated solvents is preferred. Suitable aromatic solvents include toluene, xylene, ethylbenzene, tetralin, naphthalene, and solvents which are narrow cut aromatic solvents comprising $C_8$ to $C_{13}$ aromatics such as those marketed by Exxon Company U.S.A. under the name Aromatic 100, Aromatic 150, and Aromatic 200. The oxygenated solvents should not be extremely polar such as to become incompatible with the aromatic solvents. Suitable oxygenated solvents include propylene glycol monomethyl ether acetate, propylene glycol propyl ether acetate, ethoxypropionate, dipropylene glycol monomethyl ether acetate, propylene glycol monomethyl ether, propylene glycol monopropyl ether, dipropylene glycol monomethyl ether, diethylene glycol monobutyl ether acetate, ethylene glycol monoethyl ether acetate, ethylene glycol monobutyl ether acetate, ethylene glycol monoethyl ether, ethylene glycol monobutyl ether, diethylene glycol monoethyl ether, diethylene glycol monoethyl ether acetate, Dibasic ester (a mixture of esters of dibasic acids marketed by DuPont), ethyl acetate, n-propyl acetate, isopropyl acetate, butyl acetate, isobutyl acetate, amyl acetate, isoamyl acetate, mixtures of hexyl acetates such as those sold by Exxon Chemical Company under the brand name Exxate 700, acetone, methyl ethyl ketone, methyl isobutyl ketone, methyl amyl ketone, methyl isoamyl ketone, methyl heptyl ketone, isophorone, isopropanol, n-butanol, sec.-butanol, isobutanol, amyl alcohol, isoamyl alcohol, hexanols, and heptanols. The list should not be considered as limiting, but rather as examples of solvents which are useful in the present invention. The type and concentration of solvents are generally selected to obtain formulation viscosities and evaporation rates suitable for the application and baking of the coatings. Typical solvent concentrations in the formulations range from 0 to about 75% by weight with a preferred range between about 5 and 50% by weight and a most preferred range between about 10 and 40% by weight. For the preparation of high solids coatings, the amount of solvent used in the coating formulation is preferably less than 40% of the weight of the formulation.

As indicated above, the polyester coating compositions of this invention have excellent flexibility and hardness and impact resistance and can be specifically formulated with high loadings of pigment, generally at a weight ratio within the range of from about 1.25 to 1 up to about 5.0 to 1 pigment to binder ratio, without detracting seriously from the flexibility and impact properties of the cured coating. Suitable pigments which may be included in the compositions of this invention are those opacifying pigments normally used in paint and coating formulations and include titanium dioxide, zirconium oxide, zircon, zinc oxide, iron oxide, antimony oxide, carbon black, as well as chrome yellows, greens, oranges and the like. Preferred pigments include rutile $TiO_2$ and particularly weather resistant coated types of $TiO_2$. The pigments may also be blended with a suitable extender material which does not contribute significantly to hiding power. Suitable extenders include silica, baryte, calcium sulfate, magnesium silicate (talc), aluminum oxide, aluminum silicate, calcium silicate, calcium carbonate (mica), potassium aluminum silicate and other clays or clay-like materials.

The more preferred pigment/extender to binder weight loading ratios lie within the range of from about 1.5 to about 4.0, more preferably from about 1.5 to about 3.5, parts of pigment, or pigments and extender mixture, per part of binder.

The coating compositions of the invention may be applied to substrates by any suitable conventional technique such as spraying, roller coating, dip coating and the like. The composition is applied in liquid form and preferably dispersed in an organic solvent. Typical solvent concentrations in the formulations generally range from 0 to about 75% by weight, with a preferred range of between about 5 and 50% by weight and a most preferred range between about 10 and 45% by weight.

Satisfactory baking schedules for formulations of the present invention vary widely including, but not limited to, low temperature bakes of about 20 to 30 minutes at temperatures between 200° to 220° F. for large equipment applications, and high temperature bakes of about 5 to 10 seconds in 600° to 700° F. air temperature for coil coating applications. Generally speaking, sufficient baking in coil coating applications is achieved when the actual temperature of the underlying metal reaches at least 300° F., and more preferably at least 400° F. In general, the substrate and coating should be baked at a sufficiently high temperature for a sufficiently long time so that essentially all solvents are evaporated from the film and chemical reactions between the polymer and the crosslinking agent proceed to the desired degree of completion. The desired degree of completion also varies widely and depends on the particular combination of cured film properties required for a given application.

Required baking schedules also depend on the type and concentration of catalysts added to the formulations and on the thickness of the applied coating film. In general, thinner films and coatings with higher concentrations of catalyst cure more easily, i.e., at shorter baking times and/or lower temperatures.

Acid catalysts may be used to cure systems containing hexamethoxymethyl melamine and other amino crosslinking agents, and a variety of suitable acid catalysts are known to one skilled in the art for this purpose. These include, for example, p-toluene sulfonic acid, methane sulfonic acid, nonylbenzene sulfonic acid, dinonylnapthalene disulfonic acid, dodecylbenzene sulfonic acid, phosphoric acid, mono and dialkyl acid phosphate, butyl phosphate, butyl maleate, and the like or a compatible mixture of them. These acid catalysts may be used in their neat, unblocked form or combined with suitable blocking agents such as amines. Typical examples of unblocked catalysts are the King Industries, Inc. products with the tradename K-Cure ®. Examples of blocked catalysts are the King Industries, Inc. products with the tradename NACURE ®.

In some cases, carboxylic acids can be used as catalysts for the crosslinking reaction. At the higher temperatures used for coil coating, the activity of the residual carboxylic groups on the backbone polymer can sometimes provide sufficient catalysis to promote the crosslinking reaction.

The amount of catalyst employed typically varies inversely with the severity of the baking schedule. In particular, smaller concentrations of catalyst are usually required for higher baking temperatures or longer baking times. Typical catalyst concentrations for coil coating applications (400°–500° F. peak metal temperatures) would be about 0.1 to about 0.6 wt. % catalyst solids based on the weight of binder (polymer plus crosslinking agent solids). Higher concentrations of catalyst up to about 1 wt. % may be employed for cures at lower temperature or shorter times. For certain catalysts, such as phosphoric acid and the phosphate esters, an even wider range of catalyst concentration up to 3% or more can be used.

For formulations of this invention containing hexamethoxymethyl melamine as the crosslinking agent and p-toluene sulfonic acid as the catalyst, preferred curing conditions at dry film thickness of about 1 mil are catalyst concentration between about 0.1 and 0.6 wt. % based on binder, peak metal temperature between 350° and 500° F. and baking time between about 5 seconds and 60 minutes.

As indicated above, it has been found that cured coating compositions containing a relatively high pigment to binder content frequently tend to be less flexible, more brittle, less resistant to solvents, and less impervious to weathering, than those analogous compositions containing a lower content of pigment. It is believed that this phenomenon is the result of (1) a hindrance of the crosslinking reaction caused by the higher number of pigment particles present in the composition, i.e., the higher the number of particles, the larger the number of crosslinking sites which are blocked during the crosslinking reaction; and (2) adsorption of the catalyst on the pigment with attendant deactivation of the catalyst. The resulting cured coatings are thus insufficiently crosslinked and consequently exhibit poor flexibility as evidenced by T-bend test failure, poor solvent resistance as measured by ease of removal to the cured coating from a substrate using a solvent such as methyl ethyl ketone and poor gloss retention and high weight loss when subjected to accelerated weathering tests.

It has been discovered that these deficiencies in properties in high pigment to binder compositions can be largely overcome by adjusting one or more factors which leads to better crosslinking of the film. These factors include the amount of crosslinking agent, crosslinking catalyst, and the baking conditions. For example, adjustment of the amount of crosslinking agent and crosslinking catalyst within the parameters set forth above intensify the crosslinking reaction. This may be accomplished by a combination of factors including the utilization of higher levels of crosslinking agent in combination with low to moderate catalyst levels, the utilization of higher catalyst levels in combination with a low to moderate content of crosslinking agent or by utilizing higher levels of both of these components. Another way to intensify the crosslinking reaction is to intensify the baking conditions, i.e., increasing the baking time or temperature.

The crosslink density and degree of crosslinking can be monitored by evaluating the impermeability of the cured coating to organic solvent. A suitable test for evaluating this property is MEK rub test as described in paragraph 5.2 of ASTM D3732. This test measures the number of double rubs of a swab soaked with methyl ethyl ketone (MEK) required to completely remove the cured coating from a substrate. Generally speaking, the coatings of this invention are crosslinked sufficiently such that MEK rub values of greater than about 5, more preferably of at least 15 and most preferably more than 50 are achieved.

Frequently it is desirable to have even higher values for the MEK double rubs, for example from about 100 up to 200 to 250, which can result in improvement of many of the important film properties. There is, however, an upper limit. Beyond the limit, the properties deteriorate. The limit is variable, and it depends on the specific application requirements; and it may vary significantly for different coatings. The limit has to be determined for each coating and in each application.

The quantity of catalyst used also has an upper practical limit. While increasing catalyst helps to increase crosslinking, an excess of catalyst can be detrimental. Residual catalyst in the finished coating can catalyze undesirable degradation reactions. The upper limit of the catalyst also depends on the coating used, and on the specific application.

Table 1 demonstrates the concepts of the instant invention with two specific phenol terminated polyester resins as described below which have been formulated with several P/B ratios. All of the compositions with only 5% crosslinking agent are poorly crosslinked regardless of P/B or catalyst concentration, as shown by the very low MEK rub values of from 1 to 8. This poor solvent resistance is also accompanied by poor weatherability, i.e, poor gloss retention and high weight losses. The two examples with P/B of 1.75 and crosslinking catalyst of 0.2% have considerably better properties, The MEK rubs have increased to >100, and the weatherability and the hardness is improved. The best properties are achieved with formulations containing both a high concentration (15%) of crosslinking agent and high catalyst concentration (0.3). When the crosslinking agent and catalyst have been adjusted to yield good crosslinking, evidenced by MEK rubs >50, the overall balance of desirable properties improves as the P/B is raised from 0.9 through 1.5 and 1.75 to 2.0.

The compositions of this invention may also be blended with other crosslinkable polymer materials to improve the physical and chemical properties of the latter. Examples of suitable blend polymers include acrylic and methacrylic polymers and copolymers, epoxy resins, alkyd resins, epoxy/phenolic resins, epoxy/acrylic resins, aromatic and aliphatic urethane polymers, chlorinated rubber, cellulose esters and other polyester resins. Respective blend ratios of 1:20 to 20:1 may be used.

The following examples illustrate but are not intended to limit the scope of this invention.

The following examples show the preparation of esterphenol-capped polyesters.

EXAMPLE 1

Into a 5-liter four-necked flask equipped with a mechanical stirrer, heating mantle, nitrogen sparget, 10 inch column, on top of which is a Dean Stark trap and chilled water condenser, and thermometer fitted with a temperature controller, are charged 394 g. of phthalic anhydride (PA), 742 g. of isophthalic acid (IPA), 1042 g. of neopentyl glycol (NPG), and 150 g. Aromatic 100 solvent (a narrow-cut solvent of $C_9$–$C_{12}$ aromatics marketed by Exxon Company USA). The contents are heated to melting, stirred, and heating is continued to about 170° C. where the solvent/water azeotrope starts to distill out. Water removal is used to maintain the reaction. Heating is continued and the temperature allowed to rise as the water is removed to a final temperature of $-220°$ C. The total overhead collected, which is principally a mixture of neopentyl glycol and water is 243 g. The reaction mixture is cooled and charged with 347 g. of adipic acid (AA) and 138 g. of p-hydroxybenzoic acid (PHBA). The contents of the reactor are stirred and heating is continued until the temperature reaches about 140° C. The overhead collected in the first phase of the reaction is then added dropwise in order to strip the water present in the overhead away from the NPG. Heating is continued and the temperature slowly rises to 250° C. as the water formed due to the reaction distilis. The reaction is stopped after the theoretical amount of water is removed which takes about 19 hours. The reaction product is cooled and the acid number is determined (7.0 mgs. ROH/g). The product is then diluted by adding 633 g. of ethyl 3-ethoxy propionate (EEP) and 510 g. of Aromatic 100 solvent. The non volatile material (NVM) measured is 65.5% (1 hour at 150° C.). The reduced viscosity of a 10% (w/v) solution of the resin (100% basis) in a 50/50 mixture of glacial acetic acid and methyl amyl ketone (MAK) is 0.182 and the number average molecular weight is about 4,000. This polyester can be abbreviated as follows: NPG/AA/PA/IPA/PHBA: 20/4.75/5.32/8.93/2

EXAMPLE 2

Into a 5-liter flask equipped as in Example 1 are charged 1000 g. NPG, 336 of terephthalic acid and 798 gr. isophthalic acid. The contents are heated to the melting point of the NPG, stirred and heating is continued to about 200° C. where the water starts to distill out. Water phase removal is used to monitor the reaction. Heating is continued and the temperature allowed to rise as the water phase is removed to a final temperature of 240° C. until the reactor contents become completely transparent. The total overhead collected, which is principally a mixture of water and NPG is 297. The reaction mixture is charged with 332 of adipic acid, 150 of p-hydroxy-benzoic acid and the water phase distilled as a first stage. The contents of the reactor are stirred and heating is continued to distill out water. The reaction is continued and the temperature slowly rises to 230° C. The water overhead collected at this point is 309.7 250 gr. of Aromatic150 solvent is gradually charged to the reactor to assist distillation of water at final stages of this reaction. The temperature slowly rises to 240° C. and reaction is continued until the water formation ceases. The total overhead is 350.6g (346.15g. is the theoretical amount of water). The reaction product is cooled and the acid number is determined (9.6 mgs. of KOH/g). The product is then diluted by adding 1000 gr of Aromatic-150 solvent. The nonvolatile material (NVM) measured is 62.8% (1 hr at 150° C.).

The reduced viscosity of a 10% (w/v) solution of the resin (100% basis) in a 50/50 mixture of glacial acetic acid and methyl amyl ketone (MAK) is 0.207 and the number average molecular weight is about 4500 (calculated). This polyester can be abbreviated as follows: NPG/AA/TPA/IPA/PHBA; 19.2/4.55/4.05/9.61/2.

EXAMPLE 3

Pigmented paints are generally prepared by grinding titanium dioxide (TiO$_2$) into the resin formulations using a high speed disk disperser such as the Byk-Chemie DISPERMAT® Model CV. First a mill base containing TiO$_2$, polyester resin and solvent is ground; then this mill base is let down with the remaining ingredients in the formulation. Specific weights for one paint are given below:

Mill Base:
300 g of the esterphenol-capped polyester of Example 1;
500 g TiO$_2$ (Dupont TI-PURE ®-960);
25 g butanol; and
18.6 g of Aromatic 150 solvent.
Complete Formulation:
175.7 g Mill Base;
6.6 g esterphenol-capped polyester resin of Example 1;
7.75 g Cymel-®-303 (HMMM);
0.82 Byk-Chemie Product VP451 (amine blocked p-TSA);
24.0 g butanol; and
40.0 g aromatic 150 solvent.

This particular paint has a nonvolatile content of 62 wt. %, a pigment/binder weight ratio of 2.0, a HMMM concentration of 15 wt. % of binder and a catalyst level of 0.3 wt. % p-TSA on binder.

EXAMPLE 4

A second pigmented paint was prepared by the process of Example 3 except that the polyester resin composition of Example 2 replaced that of Example 1.

The following describes the preparation of cured films:

Thin films of formulations described in Examples 3 and 4 are applied to steel test panels via drawdowns and/or air spray. The basic procedures are outlined in ASTM Test Procedure D823-87, Methods A and E. Test panels are either untreated Type QD or Type S coiled rolled steel panels obtained from the Q-Panel company or polished, BONDERITE ® 1000 (iron-phosphate treatment) panels obtained from the Parker-Amchem Company. Panel sizes are either 4"×8", 3"×6", 6"×12" or 3"×5".

A model 301277 Automatic Test Panel Spray Machine made by Spraymation, Inc. is used to spray panels (Method A above); wire-wound drawdown rods and in some cases a Precision Laboratory Drawdown Machine (both from the Paul N. Gardner Company) are used to apply films via handpulled drawdowns (Method E). Target dry film thicknesses are 1 mil.

After wet films are applied as described above, panels are allowed to flash-off solvents for about 10 minutes at room temperature. The films are then cured by baking them in a large oven. All panels lay in a horizontal position during flash-off and baking. Baking schedules range from 10 to 60 minutes at temperatures between 220° and 350° F.

Hardness, flexibility and weatherability of the coated panels were evaluated. Knoop Hardness was determined in accordance with ASTM D1474. Flexibility was determined by the T-Bend test as set forth in ASTM D 4145-83 which measures the flexibility and adhesive strength of the baked coating formulation on the substrate. T-bend rating is the minimum number of thicknesses of metal around which the coated metal is bent until no fracture or adhesion failure of the coating occurs. Generally, the lower the T-bend value, the better the adhesion and flexibility of the coating. Generally speaking, for coil coating applications, T-Bend test results of 5 or less are considered acceptable. Test results of 2 or less are considered good.

Weathering properties and gloss were evaluated using ASTM G53.

Accelerated weathering was evaluated with a Quv tester employing UVB313 and UVA-340 (Type A and Type B) bulbs from Q-Panel Company; testing cycle 4 hr UV at 60° C. alternating with 4 hr moisture at 50° C.; reported value is 60 degree gloss retention (% at initial gloss) after approximately 1300±63 hours of total exposure; gloss measured in accordance with ASTM D523; reported weight loss is weight loss (in mg.) after 1300±63 hours of total exposure from a 1 mil thick coating with 60 cm$^2$ surface area.

Gloss retention results should be as high as possible, and in general, the higher the gloss retention percentage the more weather resistant the coating. Also, in general, the lower the weight loss the more weather resistant the coating.

EXAMPLE 5-12

A series of eight different pigmented paint formulations in addition to that of Example 3 were prepared using the base resin of Example 1 formulated with different levels of pigment, crosslinking agents and catalyst as shown in Table 1. Baked panels were prepared from each formulation by the process described above and were subjected to accelerated weathering tests using the test procedure described above (Bulb A). Gloss ($GL_{60}$) and Gloss Retention (Gl Rt) values are reported in Table 1 after an exposure period of 1300±63 hours.

Also reported are weight loss values for each sample after the given exposure times, T-bend values and Knoop Hardness values.

EXAMPLES 13-20

A series of eight different pigmented paint formulations in addition to that of Example 4 were prepared using the base resin of Example 2 formulated with different levels of pigment, crosslinking agent and catalyst as also shown in Table 1. Baked panels were prepared and tested as in Examples 5-12, and test results are reported in Table 1.

CONTROL

A pigmented paint formulation control was prepared as set forth in Example 3, except that the quantity of $TiO_2$ included in the formulation was reduced such that the composition had a more conventional pigment to binder weight ratio of 0.9.

The material was coated on panels are baked as set forth above.

These panels along with panels prepared in accordance with Examples 3 and 4 were subjected to accelerated weathering under a quartz ultra violet bulb B. Weight loss data after the indicated exposure time and Gloss Retention data (as a % of original gloss of the non-weathered panels) are reported in Table 1.

In the Table, P/B refers to pigment to binder weight ratio, CL refers to crosslinker content, based on % by weight of binder, and CAT refers to catalyst content, based on % by weight of binder.

An analysis of the test results shown in Table 1 reveals the following for the samples using the resin of Example 1, i.e., Example 3, Examples 5-12, and the Control. The amounts of crosslinking agent and catalyst have a very strong effect on crosslinking, as measured by the MEK double rubs. For example, all of the examples with only 5% crosslinking agent (Examples 6, 7, 10 and 11) are poorly crosslinked regardless of P/B or catalyst levels, as shown by the very low MEK double rub values of 1-5. Even though these coatings have good hardness and flexibility, they have poor solvent resistance and poor weatherability, reflected by low gloss retention and high weight loss. Increasing the crosslinking agent (Example 8) gives better crosslinking and better gloss retention as well as lower weight loss. Further improvement is noted in Example 9 which has a higher catalyst content and still better crosslinking.

Increasing the pigment to binder ratio to 1.75 and the crosslinking agent to 10% as in Example 5 yields good crosslinking and weatherability values at intermediate levels of catalyst and crosslinking agent.

In Examples 3 and 12, the pigment to binder ratio is 2.0. This set the data shows that an increase in catalyst content form 0.1 up to 0.3 (at a constant level of crosslinking agent) results in an improvement in MEK double rubs and weatherability while hardness and flexibility remain good.

In general, when the crosslinking agent and catalyst have been adjusted to yield good crosslinking, evidenced by MEK rubs > 50, the overall balance of desirable properties improves as the P/B is raised from 0.9 through 1.5 and 1.75 to 2.0.

A comparison of test results for Examples 4 and 13-20 shows properties as a function of catalyst level, crosslinker level and pigment to binder ratio quite analogous to properties discussed above.

TABLE 1

| | P/B | GL % | CAT. (%) | WEATHERING, 1300 ± 63 HRS GLOSS RET. | - WT. LOSS | T BEND | KNOOP HARDNESS | MEK DBL. RUBS |
|---|---|---|---|---|---|---|---|---|
| Ex | | | | | | | | |
| 3. | 2.0 | 15 | 0.3 | 107.6 | 6.0 | 2 | 16.7 | 187 |
| 4 | 2.0 | 15 | 0.3 | 100.5 | 5.7 | 2 | 21.7 | 246 |
| 5 | 1.75 | 10 | 0.2 | 77.0 | 5.7 | 1 | 19.4 | 122 |
| 6 | 1.5 | 5 | 0.1 | 18.5 | 54.2 | 0 | 14.6 | 5 |
| 7 | 1.5 | 5 | 0.3 | 13.4 | 68.0 | 1 | 11.0 | 1 |
| 8 | 1.5 | 15 | 0.1 | 47.6 | 10.0 | 1 | 15.8 | 135 |
| 9 | 1.5 | 15 | 0.3 | 54.5 | 6.6 | 2 | 20.5 | 250 |
| 10 | 2.0 | 5 | 0.1 | 29.3 | 29.2 | 1 | 17.1 | 1 |
| 11 | 2.0 | 5 | 0.3 | 66.1 | 35.2 | 1 | 15.5 | 1 |
| 12 | 2.0 | 15 | 0.1 | 95.5 | 6.7 | 1 | 23.4 | 23 |
| 13 | 1.75 | 10 | 0.2 | 39.4 | 5.1 | 2 | 20.0 | 172 |
| 14 | 1.5 | 5 | 0.1 | 5.3 | 9.7 | 2 | 15.8 | 8 |
| 15 | 1.5 | 5 | 0.3 | 4.7 | 50.8 | 2 | 13.9 | 2 |
| 16 | 1.5 | 15 | 0.1 | 34.9 | 7.1 | 1 | 20.7 | 126 |
| 17 | 1.5 | 15 | 0.3 | 70.2 | 6.1 | 2 | 20.0 | 250 |
| 18 | 2.0 | 5 | 0.1 | 3.8 | 15.3 | 1.5 | 17.9 | 2 |
| 19 | 2.0 | 5 | 0.3 | 5.0 | 5.7 | 1 | 17.9 | 2 |
| 20 | 2.0 | 15 | 0.1 | 39.7 | 2.8 | 2 | 21.7 | 22 |
| CONTROL | 0.9 | 15 | 0.3 | 25.0 | 11.6 | 1 | 22.0 | 250+ |

What is claimed is:

1. A liquid curable coating composition comprising a mixture of
   a) a curable, phenolic terminated polyester or diester resin having a number average molecular weight in the range of from about 1,500 to about 10,000;
   b) an amino crosslinking agent present at a level of at least about 5% by weight based on the combined weight of resin and crosslinking agent;
   c) crosslinking catalyst present at a level of at least about 0.1% by weight based on the combined weight of resin and crosslinking agent; and
   d) a pigment material selected from the group consisting of pigment, a mixture of pigments or a mixture of pigment and pigment extender, said pigment material being present in said composition at a weight ratio such that the ratio of pigment to resin binder components falls within the range of from 1.25 to 1 up to about 5.0 to 1;

said composition further characterized in that when applied to a substrate and cured by heating to a temperature of at least about 350° F., the cured film has a MEK rub value of greater than 5 as measured by ASTM D-3732, a gloss retention of 47.6 or greater and a weight loss of 10% or less after being subjected to accelerated weathering tests for 1300±63 hours as measured in accordance with ASTM G-53.

2. The composition of claim 1 wherein the MEK rub value is at least about 15.

3. The composition of claim 2 wherein the MEK rub value is greater than about 50.

4. The composition of claim 1 wherein said ratio of pigment-to-binder is within the range of from about 1.5 to about 4.0 to 1.

5. The composition of claim 4 wherein said ratio of pigment-to-binder is at least about 1.75 to 1.

6. The composition of claim 4 wherein said ratio of pigment to binder is within the range of from about 1.5 to about 3.5.

7. The composition of claim 1 wherein said crosslinking agent is present at a level of greater than about 5 up to about 30% by weight, based on the combined weight of resin and crosslinking agent.

8. The composition of claim 1 wherein said crosslinking catalyst is present at a level of from about 0.1 to 1.0% by weight, based on the combined weight of resin and crosslinking agent.

9. The composition of claim 8 containing at least about 7% by weight of said crosslinking agent, based on the combined weight of resin and crosslinking agent.

10. The composition of claim 1 wherein said resin is a polyester terminated with phenolic groups.

11. The composition of claim 10 wherein said phenol terminated polyester has a structure selected from the group consisting of:

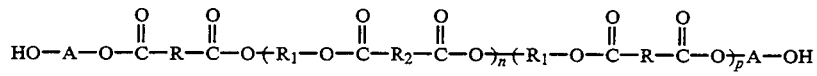

and

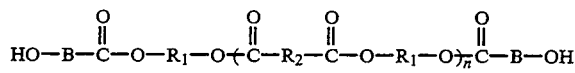

wherein R is an aliphatic divalent hydrocarbon radical containing 2 to 40 carbon atoms or a mixture of such radicals, provided however that R contains at least about 8 carbon atoms when n equals zero and p equals zero, $R_1$ is an aliphatic or cycloaliphatic hydrocarbon radical containing 2 to 40 carbon atoms or a mixture of such radicals, $R_2$ is an aliphatic, aromatic or a mixture of aliphatic and aromatic hydrocarbon radicals having from 2 to 40 carbon atoms, A is divalent aromatic radical selected from the group consisting of phenylene, naphthylene or bis phenylene, p is zero or 1, n is zero or an integer ranging from 1 to about 40, provided however, that p is zero when n is zero and p is 1 when n is an integer, and B is a phenylene radical.

12. The composition of claim 1 further containing an organic solvent for said resin present at a level of from about 5 to about 50% by weight of said composition.

13. The composition of claim 1 wherein said pigment comprises $TiO_2$.

14. The composition of claim 7 wherein said crosslinking agent is methylolmelamine or an alkoxymethylmelamine.

15. The composition of claim 1 having a Knoop hardness of at least about 4.

16. A method for forming a coil coating comprising:
a) applying the coating of claim 1 to a substrate; and
b) heating said coated substrate to a peak metal temperature of at least about 350° F. for a period of time sufficient to drive off volatile materials and to crosslink and coating, said crosslinked coating characterized by a MEK rub value of greater than 5 as measured by ASTN-D3732, a gloss retention of 47.6 or greater and a weight loss of 10% or less after being subjected to accelerated weathering tests for 1300±63 hours as measured in accordance with ASTM G-53.

17. The method of claim 16 wherein said heating is conducted at a peak metal temperature of at least about 400° F.

18. The method of claim 16 wherein said MEK rub value is at least about 15.

19. The method of claim 18 wherein said MEK rub value is greater than about 50.

20. The method of claim 16 wherein said substrate is metal.

21. A cured composition prepared by applying the composition of claim 12 to a substrate and heating said substrate to drive off the solvent and crosslink said composition.

22. The cured composition of claim 21 wherein said ratio of pigment-to-binder is at least about 1.5 to 1.

23. The cured composition of claim 22 wherein said ratio of pigment-to-binder is at least about 1.75 to 1.

* * * * *